(12) United States Patent  (10) Patent No.: US 9,218,098 B2
Hata et al.  (45) Date of Patent: Dec. 22, 2015

(54) TOUCH PANEL SUBSTRATE AND DISPLAY DEVICE

(71) Applicant: Sharp Kabushiki Kaisha, Osaka-shi, Osaka (JP)

(72) Inventors: Masayuki Hata, Osaka (JP); Tomotoshi Tsujioka, Osaka (JP); Mikihiro Noma, Osaka (JP); Kazutoshi Kida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 66 days.

(21) Appl. No.: 14/361,021

(22) PCT Filed: Dec. 6, 2012

(86) PCT No.: PCT/JP2012/081704
§ 371 (c)(1),
(2) Date: May 28, 2014

(87) PCT Pub. No.: WO2013/089019
PCT Pub. Date: Jun. 20, 2013

(65) Prior Publication Data
US 2014/0327846 A1  Nov. 6, 2014

(30) Foreign Application Priority Data
Dec. 12, 2011  (JP) .................................. 2011-271553

(51) Int. Cl.
*G06F 3/045* (2006.01)
*G06F 3/044* (2006.01)
*G06F 3/041* (2006.01)

(52) U.S. Cl.
CPC ................ *G06F 3/044* (2013.01); *G06F 3/041* (2013.01)

(58) Field of Classification Search
CPC ................................. G06F 3/041; G06F 3/044
USPC ................... 345/173, 174; 178/18.06; 349/12
See application file for complete search history.

(56) References Cited

U.S. PATENT DOCUMENTS

| 2010/0136868 | A1* | 6/2010 | Chien | ................... | G06F 3/0412 445/24 |
| 2010/0149117 | A1* | 6/2010 | Chien | ................... | G06F 3/0412 345/173 |
| 2012/0127387 | A1* | 5/2012 | Yamato | ................... | G06F 3/044 349/42 |
| 2012/0206395 | A1* | 8/2012 | Misaki | ................... | G06F 3/044 345/173 |

FOREIGN PATENT DOCUMENTS

| JP | 2010-072581 A | 4/2010 |
| JP | 2010-072584 A | 4/2010 |
| JP | 2010-160745 A | 7/2010 |

OTHER PUBLICATIONS

Official Communication issued in International Patent Application No. PCT/JP2012/081704, mailed on Feb. 26, 2013.

* cited by examiner

*Primary Examiner* — Jimmy H Nguyen
(74) *Attorney, Agent, or Firm* — Keating & Bennett, LLP (57) ABSTRACT

A conducting layer (7) is formed in a shape of a grid having a predetermined width of lines extending along the first direction (horizontal direction in the drawing) and the second direction (vertical direction in the drawing). In a region that, when seen in planar view, overlaps those lines of the conducting layer (7) which extend along the first direction, lines of an insulating light-blocking layer (6) that are wider than those of the conduction layer (7) are arranged at predetermined intervals along the second direction. The conducting layer (7) is broken at predetermined places in a region that overlaps the insulating light-blocking layer 6 when seen in plane view. This makes it possible to achieve a liquid crystal display device including a touch panel substrate that has a high aperture ratio and that can suppress leakage of light through cuts in a conducting layer.

9 Claims, 10 Drawing Sheets

| ENLARGED VIEW OF PIXEL SECTION | (CONVENTIONAL)<br>METAL WIDTH=5±1 μm<br>BM WIDTH= 8 μm | (PRESENT INVENTION)<br>METAL WIDTH=5±1 μm<br>BM WIDTH= 8 μm |
|---|---|---|
| APERTURE RATIO | 47.9% | 53.0%<br>(10.7% HIGHER THAN BEFORE) |

TOUCH PANEL SUBSTRATE AND DISPLAY DEVICE

TECHNICAL FIELD

The present invention relates to a touch panel substrate that is used in an in-cell touch panel and to a display device including such a touch panel substrate.

BACKGROUND ART

For miniaturization of devices, there has recently been widespread use of display devices each having a combination of a display section and an input section and a touch panel function. In particular, in portable terminals such as cellular phones, PDAs (personal digital assistants), and tablet PCs, there has been widespread use of display devices each including a touch panel that can detect a position of contact of a finger or a stylus with a surface on the display section.

Conventionally, there have been known various types of touch panel such as resistive (pressure-sensitive) touch panels and capacitive touch panels. Of these touch panels, capacitive touch panels have been widely used.

A capacitive touch panel detects a position of contact by detecting a change in capacitance as effected when a finger or a stylus touches the display screen. This makes it possible to detect a position of contact with a simple operation.

Further, unlike a resistive touch panel, a capacitive touch panel does not require the formation of two conducting films with an air layer sandwiched therebetween and therefore does not suffer from interfacial reflection of outside light by the interface between the air layer and either conducting film.

On the other hand, however, since a capacitive touch panel detects a position of contact by detecting a change in capacitance, exposure of the touch panel to noise causes a change in lines of electric force, thus posing a risk of making the touch panel unable to accurately detect a position of contact.

Conventionally widely-used examples of touch panels are out-cell touch panels or on-cell touch panels (for example, see Patent Literature 1) that are mounted on the outer side of a display panel.

In such a case of a touch panel provided on the outer side of a display panel, an overlap of the touch panel with the display panel undesirably causes increases in thickness and weight of the device as a whole.

Moreover, the mounting of the touch panel on the outer side of the display panel causes outside light to be reflected by the interface between the touch panel and the display panel, as well as on a surface of the touch panel, thus affecting contrast and viewability. Further, the mounting of the touch panel on the outer side of the display panel causes the touch panel per se to exhibit decreased viewability.

In view of these problems, in-cell touch panels each obtained by incorporating a touch panel into a cell in a display panel or the like have recently been under development from the point of view of a reduction in thickness, a reduction in weight, and an improvement in viewability, as well as cost advantages as such as a reduction in the number of components that is achieved by making the touch panel "in-cell" (for example, see Patent Literatures 2 and 3).

Patent Literatures 2 and 3 disclose a configuration in which a CF substrate is used as a touch panel substrate (i.e. an in-cell touch panel substrate) that constitutes an in-cell touch panel, with a sensor electrode built in between an insulating substrate in a CF substrate and a transparent counter electrode made of ITO (indium tin oxide), the sensor electrode serving as a position detection electrode that detects a position of contact of an object.

Figure 10:
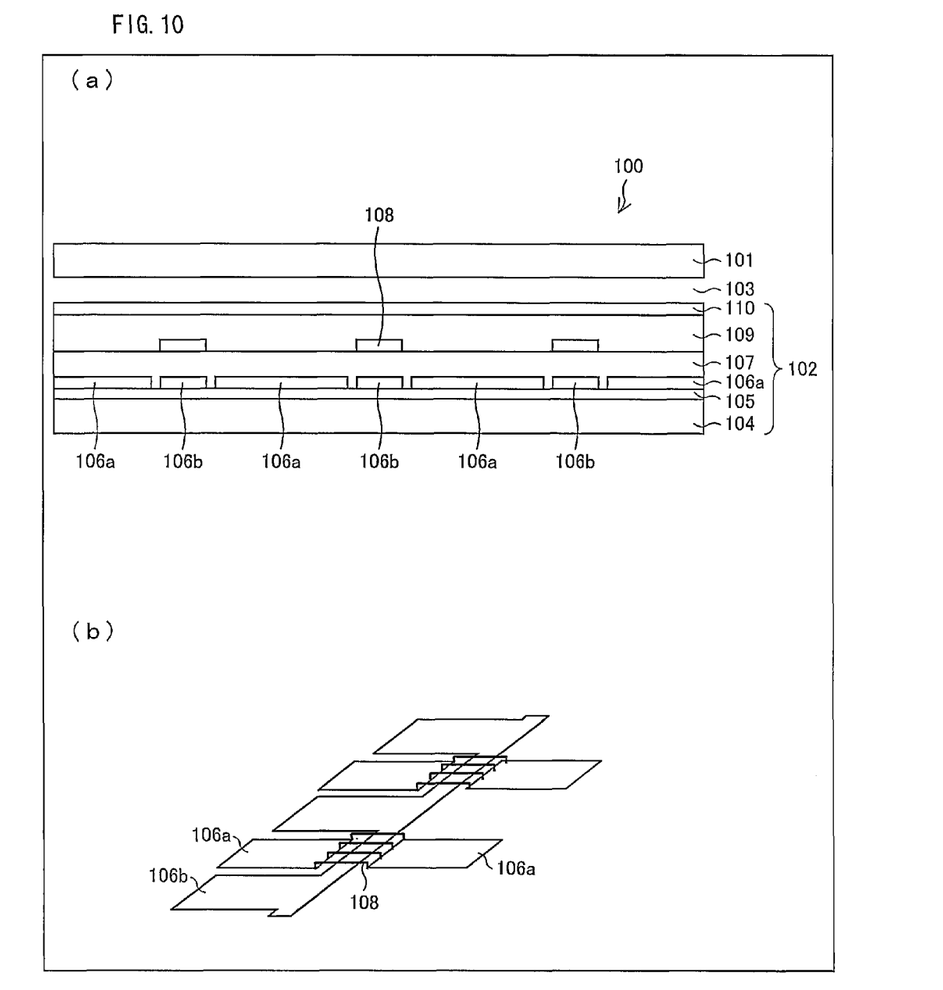
FIG. 10 is a set of diagrams (a) and (b) schematically showing a configuration of a liquid crystal display device including a conventional in-cell touch panel substrate.

FIG. 10 is a set of diagrams (a) and (b) schematically showing a configuration of a liquid crystal display device 100 including a conventional in-cell touch panel substrate.

As shown in (a) of FIG. 10, the liquid crystal display device 100 includes a TFT (thin-film transistor) substrate 101, a CF (color filter) substrate 102, and a liquid crystal layer 103 sandwiched between the TFT substrate 101 and the CF substrate 102.

Moreover, the CF substrate 102, which is an in-cell touch panel substrate, includes: a transparent insulating substrate 104; a light-blocking layer 105 (which demarcates pixels, and overlaps the after-mentioned metal wire 108 when seen in planar view) formed in a predetermined shape on the transparent insulating substrate 104; sense electrodes 106a and drive electrodes 106b formed by transparent electrodes made of ITO or the like in the same plane as a sensor electrode serving as a position detection electrode to detect a position of contact of an object; an insulating layer 107 covering the sense electrodes 106a and the drive electrodes 106b; a metal wire 108 that causes sense electrodes 106a arranged in a straight line and electrically separated from each other to be electrically connected to each other via contact holes (not illustrated) formed in the insulating layer 107; an overcoat layer 109 including a different-colored color filter layer (not illustrated) covering the insulating layer 107 and the metal wire 108; and a transparent counter electrode 110 made of ITO or the like on the overcoat layer 109.

Meanwhile, although not illustrated, the TFT substrate 101 includes a plurality of TFT elements and a plurality of pixel electrodes connected to the TFT elements, respectively.

Moreover, as shown in (b) of FIG. 10, the metal wire 108 is needed because the sense electrodes 106a and the drive electrodes 106b, formed by transparent electrodes made of ITO or the like in the same plane as a sensor electrode serving as a position detection electrode to detect a position of contact of an object, are in the form of a single layer, and serves to make an electrical connection between sense electrodes 106 formed electrically separately from each other horizontally as shown in (b) of FIG. 10.

CITATION LIST

Patent Literature 1

Japanese Patent Application Publication, Tokukai, No. 2010-72584 (Publication Date: Apr. 2, 2010)

Patent Literature 2

Japanese Patent Application Publication, Tokukai, No. 2010-72581 (Publication Date: Apr. 2, 2010)

Patent Literature 3

Japanese Patent Application Publication, Tokukai, No. 2010-160745 (Publication Date: Jul. 22, 2010)

SUMMARY OF INVENTION

Technical Problem

However, because, in the liquid crystal display device 100, as shown in FIG. 10, which includes a conventional in-cell touch panel substrate, the sense electrodes 106a and the drive electrodes 106b, formed by transparent electrodes made of ITO or the like in the same plane as a sensor electrode serving as a position detection electrode to detect a position of contact of an object, are in the form of a single layer, it is difficult to secure high sensing performance as a touch panel.

In order to secure high sensing performance as a touch panel, it has been proposed that the metal wire 108, which is comparatively low in resistance, be formed over the entire region where the sense electrodes 106a and the drive electrodes 106b are provided, in order that the resistance of the sense electrodes 106a and the drive electrodes 106b is decreased by using the metal wire 108.

Figure 11:
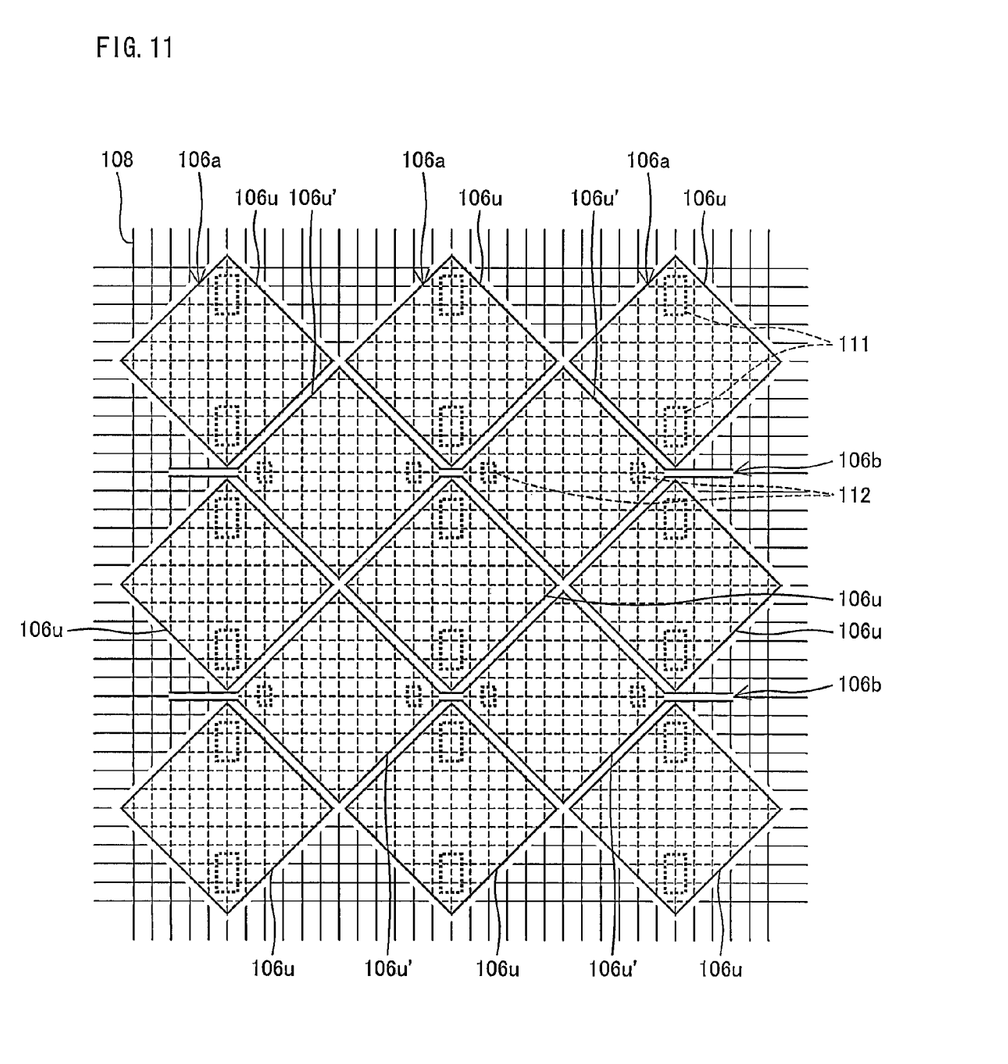
FIG. 11 is a diagram showing a grid (mesh) metal wire that is included in an in-cell touch panel substrate.

FIG. 11 is a diagram showing a grid (mesh) metal wire 108 that is included in an in-cell touch panel substrate.

As shown in FIG. 11, rhomboid unit electrodes 106u formed electrically separately from each other are disposed adjacent to each other vertically and horizontally as shown in FIG. 11, and a plurality of unit electrodes 106u adjacent to each other vertically as shown in FIG. 11 are electrically connected to each other to form a single sense electrode 106a, with horizontal arrangements of sense electrodes 106a extending in parallel with each other as shown in FIG. 11.

Meanwhile, rhomboid unit electrodes 106u' disposed adjacent to each other vertically and horizontally as shown in FIG. 11 are electrically connected only horizontally as shown in FIG. 11 to form a single drive electrode 106b, with vertical arrangements of drive electrodes 106b extending in parallel with each other as shown in FIG. 11.

Moreover, each of those unit electrode 106u' electrically connected to each other only horizontally to form a single drive electrode 106b is surrounded by a plurality of unit electrodes 106u.

The unit electrodes 106u and the unit electrodes 106u' are formed on the same plane, and a connection between unit electrodes 106u' forming a single drive electrode 106b is formed between unit electrodes 106u vertically adjacent to each other. Therefore, in order to form a single sense electrode 106a by electrically connecting a plurality of unit electrodes 106u adjacent to each other vertically as shown in FIG. 11, it is necessary to use a metal wire 108 formed on a different level from a layer forming the unit electrodes 106u and the unit electrodes 106u'.

The metal wire 108 has a part that, when seen in planar view, overlaps the sense electrodes 106a each formed by electrically connecting a plurality of unit electrodes 106u vertically adjacent to each other. This part of the metal wire 108 is patterned so that a conduction can be made for each sense electrode 106u. The metal wire 108 also has a part that, when seen in planar view, overlaps the drive electrodes 106b each formed by electrically connecting unit electrodes 106u' only horizontally as shown in FIG. 11. This part of the metal wire 108 is patterned so that an electrical separation is made for each unit electrode 106u'.

Moreover, as shown in FIG. 11, a plurality of unit electrodes 106u vertically adjacent to each other are electrically connected to each other by the metal wire 108 via contact holes 111 formed in the insulating layer (not illustrated), and those lines of the metal wire 108 which extend in parallel with a plurality of unit electrodes 106u vertically adjacent to each other, achieve a reduction in resistance of each of the sense electrodes 106a.

Meanwhile, the unit electrodes 106u' of each of the drive electrodes 106b are electrically connected to the metal wire 108 via contact holes 112 formed in the insulating layer (not illustrated), thereby achieving a reduction in resistance of each of the driver electrodes 106b.

Moreover, in a configuration in which the metal wire 108 is included, a grid (mesh) light-blocking layer (not illustrated) whose line width is greater than that of the metal wire 108 needs to be provided in such a manner as to overlap the metal wire 108 when seen in planar view, in order to suppress a degradation in appearance due to reflection of light by a cut surface or surface of the metal wire 108. Each square or rectangle in the grid (mesh) light-blocking layer serves as an area for a single pixel.

However, the shape of such a grid (mesh) light-blocking layer poses a problem as it undesirably invites a decrease in aperture ratio in each pixel.

Figure 12:
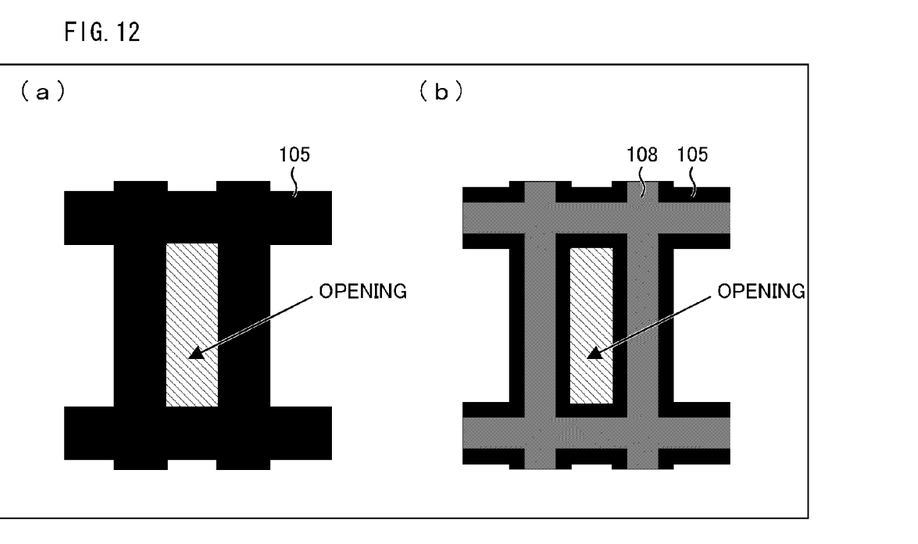
FIG. 12 is a set of diagrams (a) and (b), the diagram (a) showing an opening in a single pixel in the absence of a metal wire, the diagram (b) showing an opening in a single pixel in the presence of a metal wire.

(a) of FIG. 12 shows an opening in a single pixel in the absence of a metal wire 108. (b) of FIG. 12 shows an opening in a single pixel in the presence of a metal wire 108.

In the presence of a metal wire 108, as shown in (b) of FIG. 12, a grid (mesh) light-blocking layer 105 whose line width is greater than that of the metal wire 108 needs to be provided in order to suppress a degradation in appearance. Since the current deposition width tolerance of the metal wire 108 is estimated to be ±0.2 μm, the light-blocking layer 5 needs to be designed to have its width greater by this tolerance, in order for the metal wire 108 to overlap the light-blocking layer 105. Therefore, such an overlap between the metal wire 108 and the light-blocking layer 105 per se undesirably invites an increase in width of the light-blocking lines. Therefore, as a result, the area of an opening in each pixel is smaller than the area of an opening in each pixel in the absence of a metal wire 108 (see (a) of FIG. 12). This undesirably invites a decrease in aperture ratio in each pixel.

Figure 13:
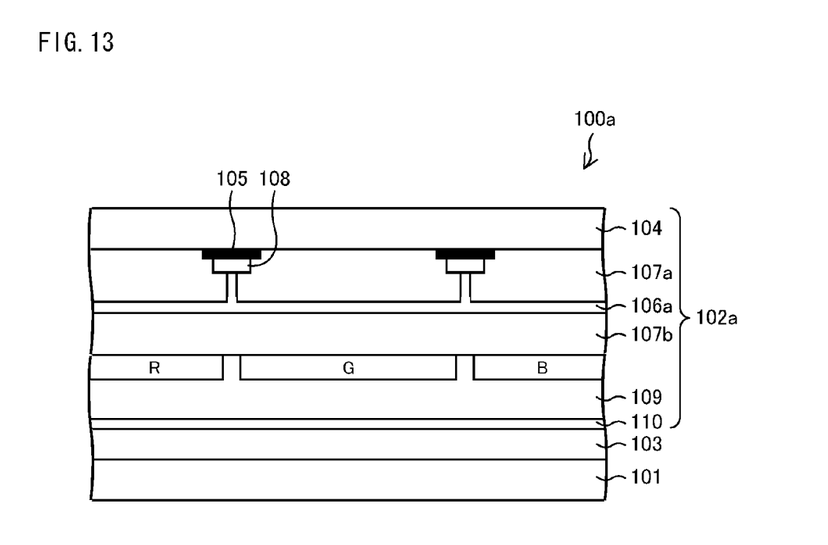
FIG. 13 is a diagram schematically showing a configuration of a liquid crystal display device including a touch panel substrate including the grid (mesh) metal wire shown in FIG. 11.

FIG. 13 is a diagram schematically showing a configuration of a liquid crystal display device 100a including a touch panel substrate 102a including the grid (mesh) metal wire 108 shown in FIG. 11.

In the configuration shown in FIG. 13, unlike in the configuration shown in (a) of FIG. 10, a layer forming the metal wire 108 is located closer to the transparent insulating substrate 104 than the layer forming the sense electrodes 106a and the drive electrodes 106b (not illustrated).

The touch panel substrate 102a includes: a transparent insulating substrate 104; a light-blocking layer 105 (which demarcates pixels, and overlaps the metal wire 108 when seen in planar view) formed in a predetermined shape on the transparent insulating substrate 104; an insulating layer 107a covering the light-blocking layer 105 and the metal wire 180; sense electrodes 106a and drive electrodes 106b electrically connected to the metal wire 108 via contact holes formed in the insulating layer 107a; an insulating layer 107b covering the sense electrodes 106a, the drive electrodes 106b (not illustrated), and the insulating layer 107a; an overcoat layer 109 including a different-colored color filter layer (R, G, and B) covering the insulating layer 107b; and a transparent counter electrode 110 made of ITO or the like on the overcoat layer 109.

Figure 14:
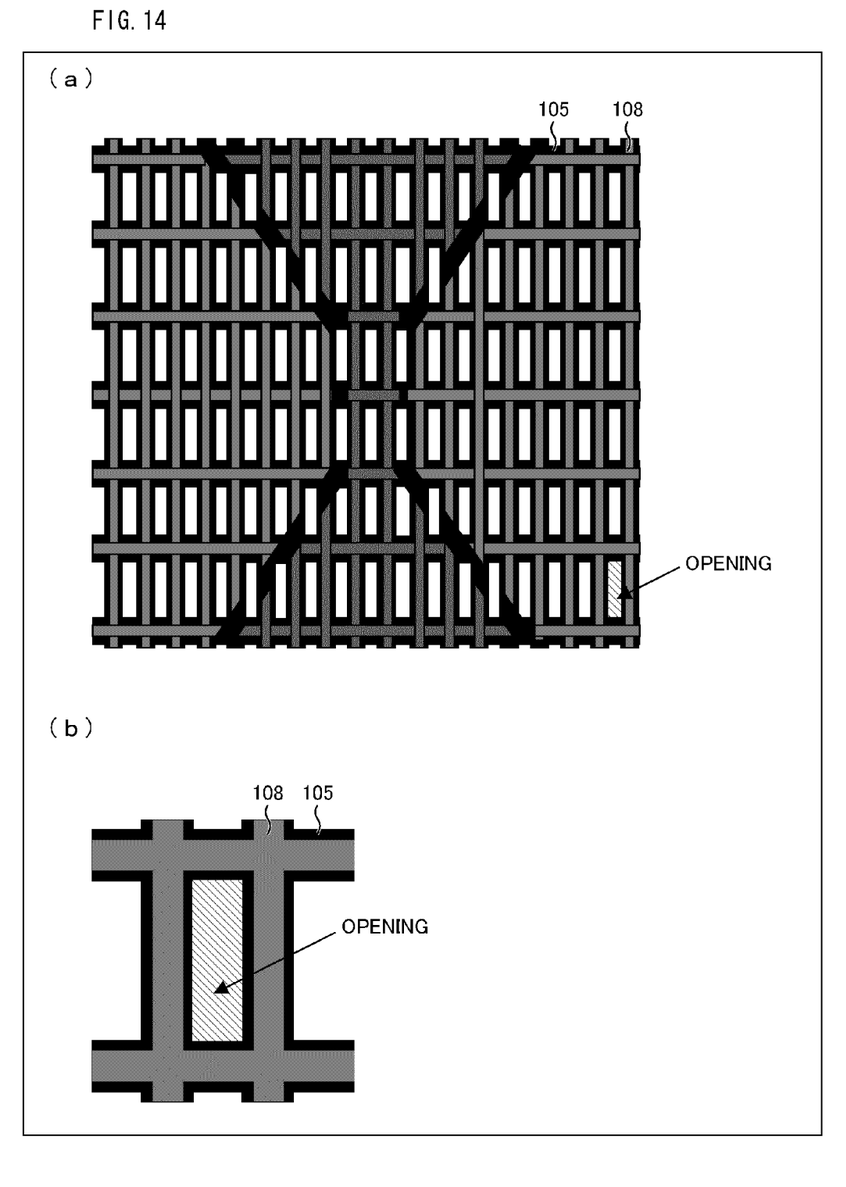
FIG. 14 is a set of diagrams (a) and (b), the diagram (a) showing cuts in the metal wire in the touch panel substrate shown in FIG. 13, the diagram (b) showing an opening in a single pixel in the touch panel substrate shown in FIG. 13.

(a) of FIG. 14 showings cuts in the metal wire 108 in the touch panel substrate 102a shown in FIG. 13.

As mentioned above, the metal wire 108 has a part that, when seen in planar view, overlaps the sense electrodes 106a each formed by electrically connecting a plurality of unit electrodes 106u, and this part of the metal wire 108 needs to be patterned so that a conduction can be made for each sense electrode 106u. The metal wire 108 also has a part that, when seen in planar view, overlaps the drive electrodes 106b, and this part of the metal wire 108 needs to be patterned so that an electrical separation is made for each unit electrode 106u'.

(b) of FIG. 14 shows an opening in a single pixel in the touch panel substrate 102a shown in FIG. 13.

In this case, too, the area of an opening in each pixel is smaller than the area of an opening in each pixel in the absence of a metal wire 108. This invites a decrease in aperture ratio in each pixel.

In order to suppress such a decrease in aperture ratio, it is a possible option not to provide a grid (mesh) light-blocking layer 105 whose line width is greater than that of the metal wire 108. In this case, however, although an improvement in aperture ratio can be achieved, there occur reflection of light by the metal wire 108 and leakage of light through cuts in the metal wire 108, which undesirably invite a degradation in appearance.

The present invention has been made in view of the foregoing problems, and it is an object of the present invention to provide a touch panel substrate that has a high aperture ratio and that can suppress leakage of light through cuts in a conducting layer (metal wire) and a display device that has improved appearance.

Solution to Problem

In order to solve the foregoing problem, a touch panel substrate of the present invention is a touch panel substrate having an insulating substrate provided with a position detection electrode, the position detection electrode detecting, according to a change in capacitance, a position on coordinates as indicated by an object to be detected, the touch panel substrate including: first and second unit electrodes over the insulating substrate, the first and second unit electrodes not overlapping each other when seen in planar view, the first and second unit electrodes being adjacent to each other, the first and second unit electrodes being formed on a same plane, the first and second unit electrodes allowing visible light to travel therethrough, the position detection electrode including a plurality of first electrodes arranged along a first direction and a plurality of second electrodes arranged along a second direction intersecting the first direction, the first electrodes being each formed by a plurality of the first unit electrodes electrically connected to each other via a conducting layer that is on a different level from the first and second unit electrodes, the second electrodes being each formed by a plurality of the second unit electrodes electrically connected to each other in the same plane, the conducting layer being formed in a shape of a grid having a predetermined width of lines extending along the first direction and the second direction, in a region that, when seen in planar view, overlaps those lines of the conducting layer which extend along either the first direction or the second direction, lines of an insulating light-blocking layer that are wider than those of the conducting layer being provided at predetermined intervals, those lines of the conducting layer which are provided in a region that overlaps the first electrodes when seen in planer view being electrically connected to the first electrodes and, in a region that overlaps the insulating light-blocking layer when seen in planar view, being broken so as to be able to conduct only for the first electrodes, respectively, those lines of the conducting layer which are provided in a region that overlaps the second electrodes when seen in planer view being broken in the region that overlaps the insulating light-blocking layer when seen in planar view, so as to be electrically connected to the second unit electrodes, respectively, of each of the second electrodes.

In order to solve the foregoing problems, a display device of the present invention includes such a touch panel substrate.

Advantageous Effects of Invention

As described above, a touch panel substrate of the present invention includes: including: first and second unit electrodes over the insulating substrate, the first and second unit electrodes not overlapping each other when seen in planar view, the first and second unit electrodes being adjacent to each other, the first and second unit electrodes being formed on a same plane, the first and second unit electrodes allowing visible light to travel therethrough, the position detection electrode including a plurality of first electrodes arranged along a first direction and a plurality of second electrodes arranged along a second direction intersecting the first direction, the first electrodes being each formed by a plurality of the first unit electrodes electrically connected to each other via a conducting layer that is on a different level from the first and second unit electrodes, the second electrodes being each formed by a plurality of the second unit electrodes electrically connected to each other in the same plane, the conducting layer being formed in a shape of a grid having a predetermined width of lines extending along the first direction and the second direction, in a region that, when seen in planar view, overlaps those lines of the conducting layer which extend along either the first direction or the second direction, lines of an insulating light-blocking layer that are wider than those of the conducting layer being provided at predetermined intervals, those lines of the conducting layer which are provided in a region that overlaps the first electrodes when seen in planer view being electrically connected to the first electrodes and, in a region that overlaps the insulating light-blocking layer when seen in planar view, being broken so as to be able to conduct only for the first electrodes, respectively, those lines of the conducting layer which are provided in a region that overlaps the second electrodes when seen in planer view being broken in the region that overlaps the insulating light-blocking layer when seen in planar view, so as to be electrically connected to the second unit electrodes, respectively, of each of the second electrodes.

As described above, a display device of the present invention includes such a touch panel substrate.

This makes it possible to achieve a touch panel substrate that has a high aperture ratio and that can suppress leakage of light through cuts in a conducting layer and a display device that has improved appearance.

DESCRIPTION OF EMBODIMENTS

Embodiments of the present invention are described in detail below with reference to the drawings. However, the dimensions, materials, shapes, and relative placement of components described in the embodiments below are merely examples, and the scope of invention should not be narrowly interpreted thereby.

[Embodiment 1]

A first embodiment of the present invention is described below with reference to FIGS. 1 through 5.

Figure 3:
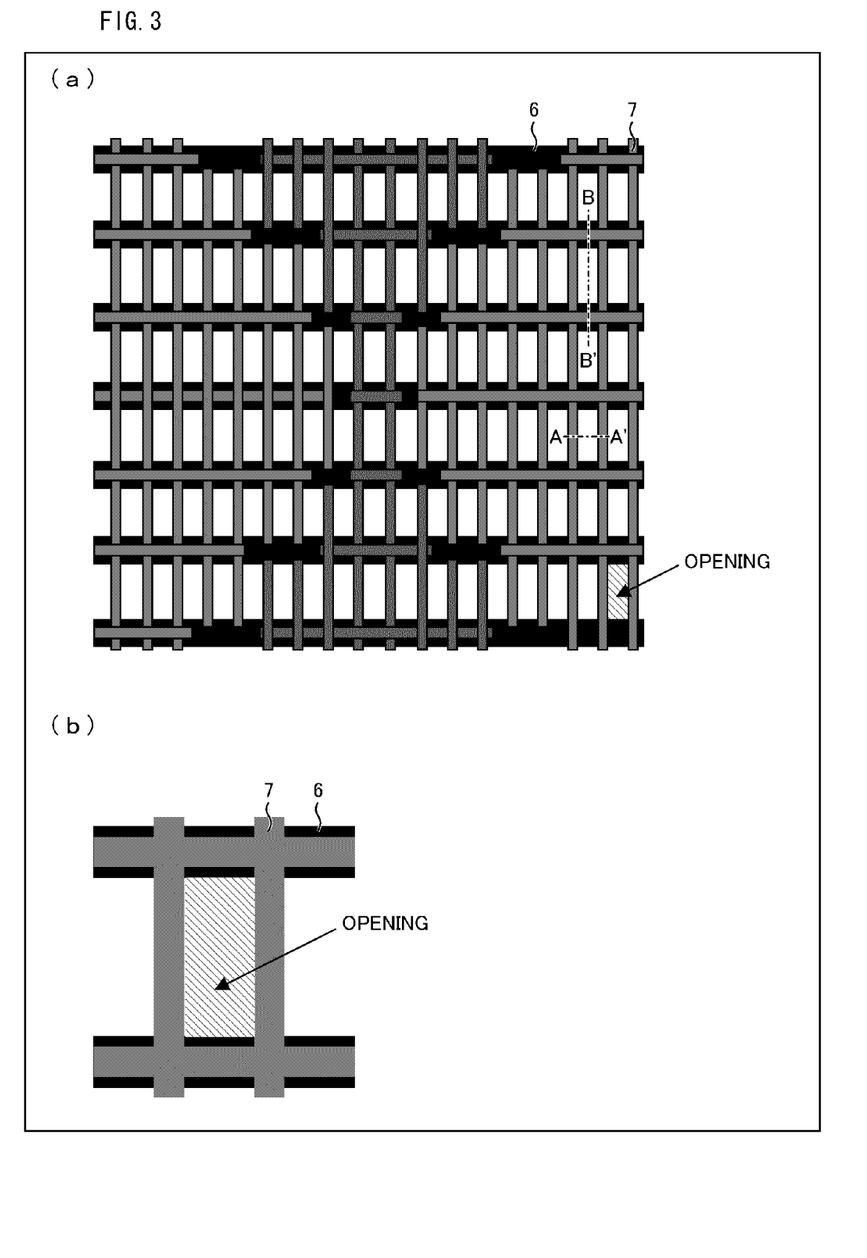
FIG. 3 is a set of diagrams (a) and (b), the diagram (a) being a schematic view showing a relationship of placement between an insulating light-blocking layer and a conducting layer that are provided in a liquid crystal display device according to an embodiment of the present invention, the diagram (b) being a partially enlarged view of a pixel section in this case.

(a) of FIG. 3 is a schematic view showing a relationship of placement between an insulating light-blocking layer 6 and a conducting layer 7 that are provided in a liquid crystal display device 1 according to the present embodiment, and (b) of FIG. 3 is a partially enlarged view of a pixel section in this case.

The liquid crystal display device 1 according to the present embodiment differs from the liquid crystal display device 100a described above with reference to FIGS. 11, 13, and 14 in terms of the location of formation of the insulating light-blocking layer 6 and the cuts in the conducting layer 7. As for the other components, the liquid crystal display device 1 is identical to the liquid crystal display device 100a.

As shown in (a) of FIG. 3, the conducting layer 7 is in the shape of a grid having a predetermined width of lines along a first direction (horizontal direction in the drawing) and a second direction (vertical direction in the drawing), and in a region that, when seen in planar view, overlaps those lines of the conducting layer 7 which extend along the first direction (horizontal direction in the drawing), the lines of the insulating light-blocking layer 6 that are wider than those of the conducting layer 7 are arranged at predetermined intervals along the second direction (vertical direction in the drawing).

Moreover, although not illustrated in (a) of FIG. 3, the liquid crystal display device 1 according to the present embodiment has a position detection electrode including electrodes having the same shapes as the sense electrodes 106a and the drive electrodes 106b, which includes the rhomboid unit electrodes 106u and 106u', shown in FIG. 11. However, this does not imply any limitation. The position detection electrode may include sense electrodes 106a and drive electrodes 106b including unit electrodes of a shape other than a rhombus.

Furthermore, those lines of the conductive layer 7 which are provided in a region that, when seen in planar view, overlaps the sense electrodes 106a (not illustrated) arranged along the second direction (vertical direction in the drawing) are electrically connected to the sense electrodes 106a (not illustrated) and, in a region that overlaps the insulating light-blocking layer 6 when seen in planar view, are broken so as to be able to conduct only for the sense electrodes 106a (not illustrated), respectively.

Meanwhile, those lines of the conductive layer 7 which are provided in a region that, when seen in planar view, overlap the sense electrodes 106b (not illustrated) arranged along the first direction (horizontal direction in the drawing) are broken in a region that overlaps the insulating light-blocking layer 6 when seen in planar view, so as to be electrically connected to the unit electrodes 106u' (not illustrated), respectively, of each of the drive electrodes 106b.

Therefore, in the liquid crystal display device 1 according to the present embodiment, as shown in (b) of FIG. 3, the lines of the insulating light-blocking layer 6 that are wider than those of the conducting layer 7 are provided at predetermined intervals only in a region that, when seen in planar view, overlaps those lines of the conducting layer 7 which extend along the first direction (horizontal direction in the drawing). Accordingly, in the second direction (vertical direction in the drawing), the lines of the insulating light-blocking layer 6 that are wider than those of the conducting layer 7 make it possible to suppress a reduction in the area of an opening in each pixel.

Whether the lines of the insulating light-blocking layer 6 that are wider than those of the conducting layer 7 are provided at predetermined intervals only in a region that overlaps, when seen in planar view, those lines of the conducting layer 7 which extend along the first direction (horizontal direction in the drawing), or, as will be shown in Embodiment 2, at predetermined intervals only in a region that, when seen in planar view, overlaps those lines of the conducting layer 7 which extend along the second direction (vertical direction in the drawing), needs only be determined in consideration of the shape of the pixels so that a wider area can be reserved for an opening in each pixel.

Figure 4:
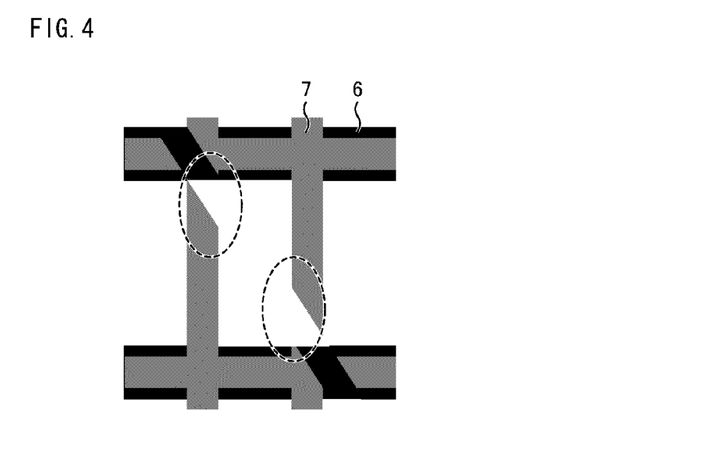
FIG. 4 is a diagram showing an example of leakage of light through cuts in a conducting layer.

FIG. 4 is a diagram showing an example of leakage of light through cuts in the conducting layer 7.

As shown in FIG. 4, a break in the conducting layer 7 in a region where there is no overlap between the insulating light-blocking layer 6 and the conduction layer 7 in planar view allows light to leak therethrough, thus degrading the appearance of the liquid crystal display device.

In the liquid crystal display device 1 according to the present embodiment, as shown in (a) of FIG. 3, since the conducting layer 7 has a break in a region overlapping the insulating light-blocking layer 6 when seen in planar view, leakage of light though cuts in the conducting layer 7 can be suppressed.

This allows the liquid crystal display device 1 to achieve improved appearance.

In the present embodiment, the insulating light-blocking layer 6 used is a resin BM (resin containing carbon black).

The resin BM per se has high resistance, but, depending on its carbon black content, may allow a slight current to pass therethrough, in which case an insulating layer may be provided between the insulating light-blocking layer 6 and the conducting layer 7.

It should be noted that the insulating light-blocking layer 6 is required to have the following capabilities: the insulating light-blocking layer 6 is required to have such a light-blocking property as to prevent leakage of light for pixel demarcation; and the insulating light-blocking layer 6 is required not to constitute a shield not to lower the SN ratio (signal-to-noise ratio) of the touch panel, i.e., required to have an insulating property (high resistance).

Therefore, for example, an electric conductor sandwiched between an insulating layer is not preferred as it constitutes a shield.

Other than the resin BM (resin containing carbon black) used in the present embodiment, any insulating light-blocking layer 6 can be used, provided that it has the aforementioned capabilities.

Further, the conducting layer 7 can be made of a metal material such as a low-resistance metal, a metal compound thereof, as well as a metal silicide thereof. Examples of the low-resistance metal include titanium (Ti), copper (Cu), gold (Au), aluminum (Al), tungsten (W), zinc (Zn), nickel (Ni), tin (Sn), chromium (Cr), molybdenum (Mo), and tantalum (Ta).

In the liquid crystal display device 1 according to the present embodiment, as shown in (a) of FIG. 3, a single pixel is demarcated by two lines of the insulating light-blocking layer 6 and two lines of the conducting layer 7. Therefore, in the present embodiment, the conducting layer 7 has its surface covered with a chromium oxide layer for further suppressing a degradation in appearance of the liquid crystal display device 1 due to reflection of light by the conducting layer 7.

A configuration of the liquid crystal display device 1 is described below with reference to FIGS. 1 and 2.

Figure 1:
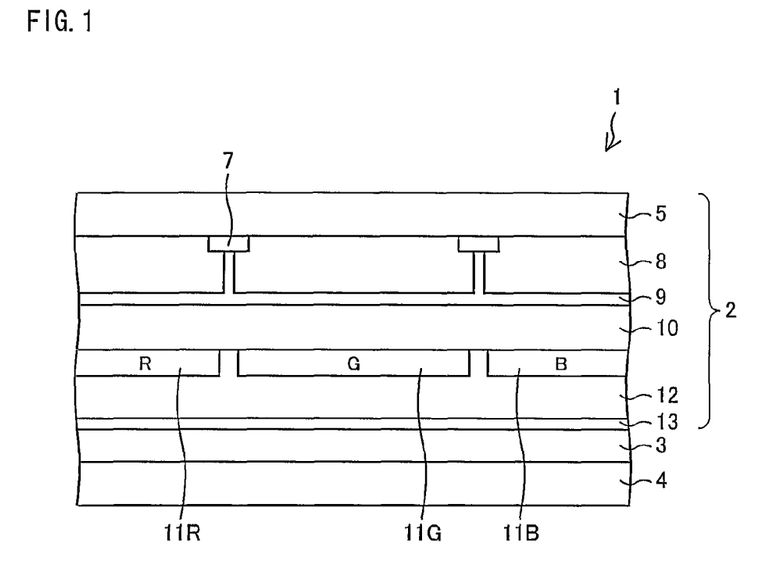
FIG. 1 is a cross-sectional view of a liquid crystal display device according to an embodiment of the present invention as taken along the line A-A' shown in (a) of FIG. 3.

FIG. 1 is a cross-sectional view of the liquid crystal display device 1 as taken along the line A-A' shown in (a) of FIG. 3.

As shown in FIG. 1, the liquid crystal display device 1 includes a CF (color filter) substrate 2; a TFT (thin-film transistor) substrate 4, and a liquid crystal layer 3 sandwiched between the CF substrate 2 and the TFT substrate 4.

Moreover, the CF (color filter) substrate 2 in this region includes the following layers joined on top of each other in the order named: the transparent insulating substrate 5; the conducting layer 7 shown in (a) of FIG. 3; an insulating layer 8 covering the conducting layer 7; a position detection electrode 9 (i.e. the sense electrodes 106a and the drive electrodes 106b shown in FIG. 11), electrically connected to the conducting layer 7, which allows visible light to travel therethrough; an insulating layer 10 covering the position detection electrode 9 and the insulating layer 8; an overcoat layer 12 including a different-colored (11R, 11G, 11B) color filter layer covering the insulating layer 10; and a transparent counter electrode 13 made of ITO or the like on the overcoat layer 12.

Figure 2:
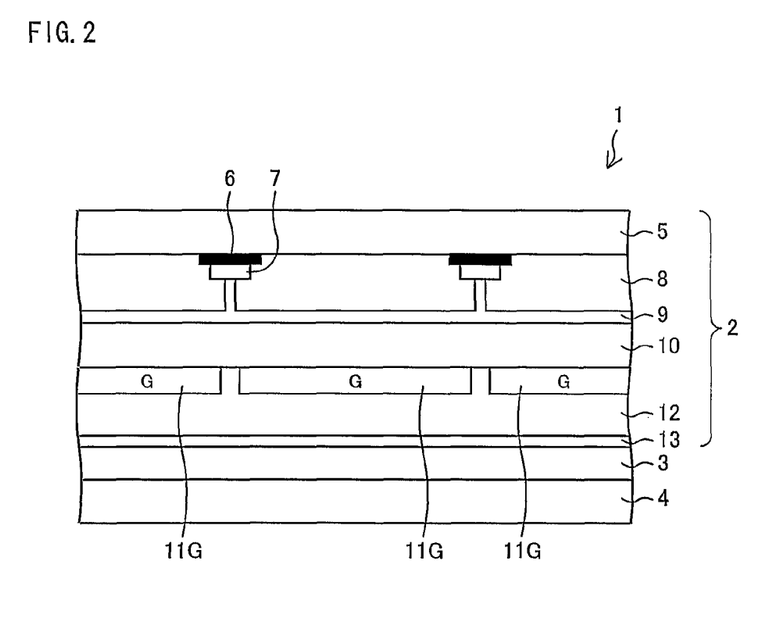
FIG. 2 is a cross-sectional view of a liquid crystal display device according to an embodiment of the present invention as taken along the line B-B' shown in (a) of FIG. 3.

FIG. 2 is a cross-sectional view of the liquid crystal display device 1 as taken along the line B-B' shown in (a) of FIG. 3.

The CF (color filter) substrate 2 in this region includes the following layers joined on top of each other in the order named: the transparent insulating substrate 5; the insulating light-blocking layer 6 (see (a) of FIG. 3) on the transparent insulating layer 5, the insulating light-blocking layer 6 having a predetermined shape; the conducting layer 7 (see (a) of FIG. 3) on the insulating light-blocking layer 6; the insulating layer 8, covering the insulating light-blocking layer 6 and the conducting layer 7; the position detection electrode 9 (i.e. the sense electrodes 106a and the drive electrodes 106b shown in FIG. 11), electrically connected to the conducting layer 7, which allows visible light to travel therethrough, via a contact hole formed in the insulating layer 8; the insulating layer 10, covering the position detection electrode 9 and the insulating layer 8; the overcoat layer 12, including a different-colored (11R, 11G, 11B) color filter layer covering the insulating layer 10; and the transparent counter electrode 13, made of ITO or the like on the overcoat layer 12.

The present embodiment has been described by taking as an example a case where the conducting layer 7 is in a higher position than the insulating light-blocking layer 6. However, the present invention is not limited to such an example. As long as the lines of the insulating light-blocking layer 6 that are wider than those of the conducting layer 7 are provided in a region that, when seen in planar view, overlaps those lines of the conducting layer 7 which extend along the first direction (horizontal direction in the drawing), it does not matter whether the conducting layer 7 is in a higher or lower position than the insulating light-blocking layer 6.

However, from the point of view of suppressing a decrease in reflection contrast of a display and the point of view of maintaining display quality owing to the disappearance of diamond patterns formed by cuts in the conducting layer 7 as seen from the display surface, it is preferable that the liquid crystal display device 1 be configured such that the insulating light-blocking layer 6 is located closer to the display surface than the conducting layer 7.

There is no particular problem in inserting another layer between the insulating light-blocking layer 6 and the conducting layer 7, provided that such a layer does not cause an increase in interlayer thickness, causes a degradation in the light-blocking capability, or makes it impossible to demarcate the pixels.

Further, as above the present invention has described a case where the CF (color filter) substrate 2, which is a touch panel substrate, includes the color filter layer (11R, 11G, 11B) and the transparent counter electrode 13 made of ITO or the like. However, the present invention is not limited to such a case. For example, the present invention is also applicable to COA (color filter on array) liquid crystal display devices in which the color filter layer (11R, 11G, 11B) are provided toward the TFT (thin-film transistor) substrate and to liquid crystal display devices, such as IPS (in-plane switching) liquid crystal display devices and FFS (fringe-field switching) liquid crystal display devices, in which the counter electrode is provided toward the TFT (thin-film transistor) substrate.

An IPS or FFS liquid crystal display device may include an ITO slid film that serves as a shield against radiation noise from the TFTs, although it does not need to include a color filter layer or a counter electrode toward the touch panel substrate.

Figure 5:
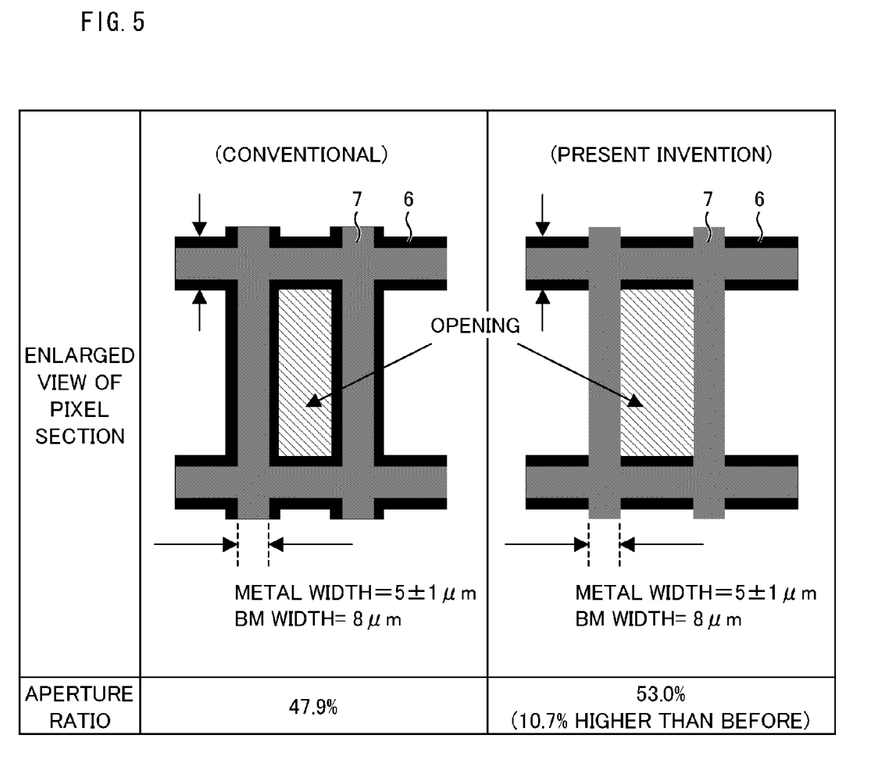
FIG. 5 is a diagram for explaining the degree of improvement in aperture ratio of a liquid crystal display device according to an embodiment of the present invention as compared with the aperture ratio of a liquid crystal display device shown in FIG. 13.

FIG. 5 is a diagram for explaining the degree of improvement in aperture ratio of the liquid crystal display device 1 as compared with the aperture ratio of the liquid crystal display device 100a shown in FIGS. 11, 13, and 14.

As shown in FIG. 5, the aperture ratio was calculated for both the liquid crystal display device 100a and the liquid crystal display device 1 on the basis of a case where each of the lines of the insulating light-blocking layer 6 formed has a width (BM WIDTH) of 8 μm and each of the lines of the conducting layer 7 formed has a width (METAL WIDTH) of 5±1 μm.

The aperture ratio of the liquid crystal display device 100a in which case was 47.9%, and the aperture ratio of the liquid crystal display device 1 was 53.0%. Therefore, there is a rise of 5.1% in aperture ratio, which means an improvement of 10.7% as compared with the aperture ratio (47.9%) of the liquid crystal display device 100a.

[Embodiment 2]

Next, a second embodiment of the present invention is described with reference to FIG. 6. The present embodiment differs from Embodiment 1 in that in the present embodiment, the lines of the insulating light-blocking layer 6 that are wider than those of the conducting layer 7 are arranged at predetermined intervals in a region that, when seen in planar view, overlaps those lines of the conducting layer 7 which extend along the second direction (vertical direction in the drawing). As for the other components, the present embodiment is identical to Embodiment 1. For convenience of explanation, members having the same functions as those shown in the drawings of Embodiment 1 are given the same reference signs, and such, are not described here.

Figure 6:
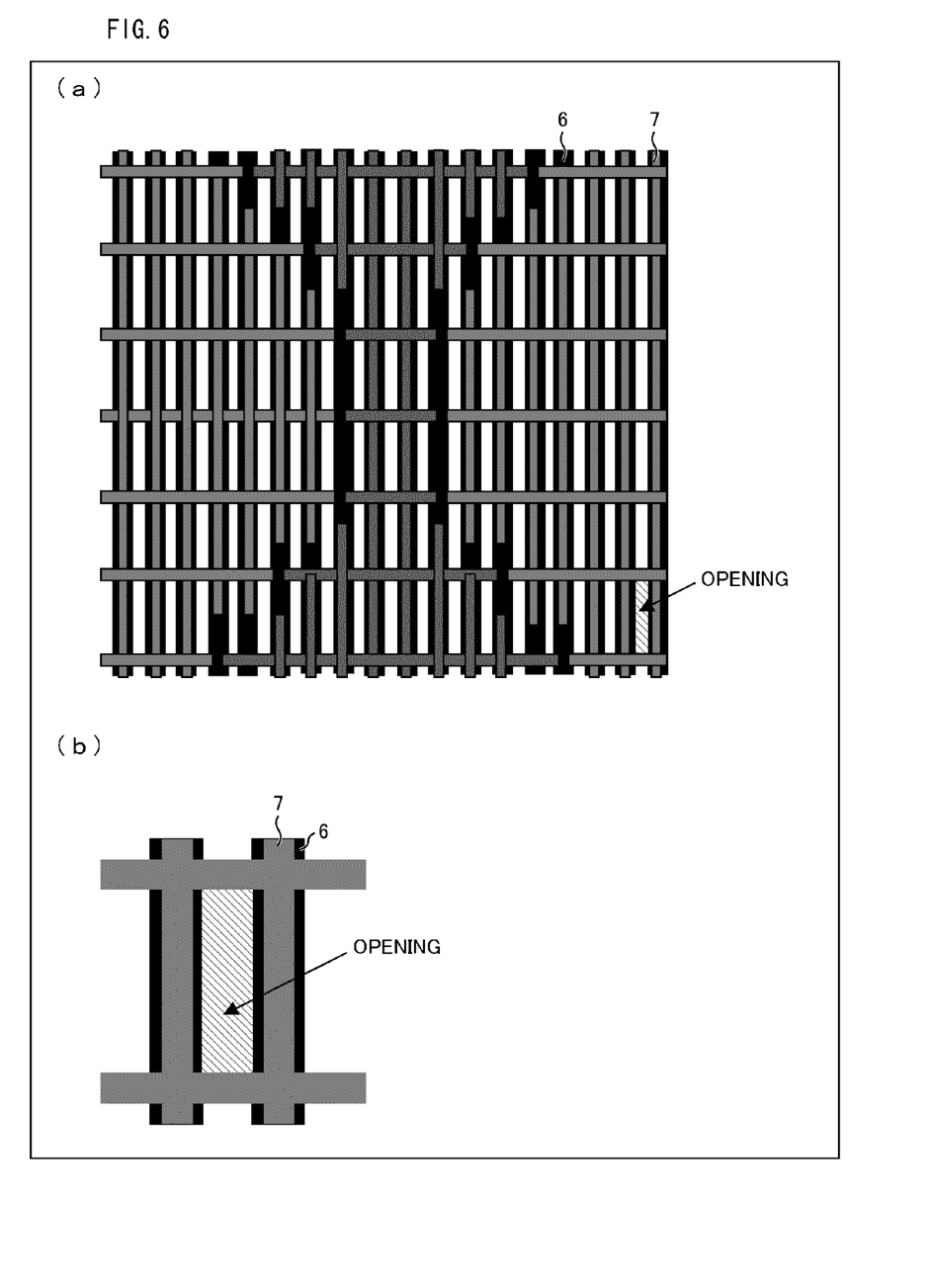
FIG. 6 is a set of diagrams (a) and (b), the diagram (a) being a schematic view showing a relationship of placement between an insulating light-blocking layer and a conducting layer that are provided in a liquid crystal display device according to another embodiment of the present invention, the diagram (b) being a partially enlarged view of a pixel section in this case.

(a) of FIG. 6 is a schematic view showing a relationship of placement between an insulating light-blocking layer 6 and a conducting layer 7 that can be used in a liquid crystal display device according to the present embodiment, and (b) of FIG. 6 is a partially enlarged view of a pixel section in this case.

As shown in (a) of FIG. 6, the liquid crystal display device according to the present embodiment differs from the liquid crystal display device 100a described above with reference to Embodiment 1 and FIGS. 11, 13, and 14 in terms of the location of formation of the insulating light-blocking layer 6 and the cuts in the conducting layer 7. As for the other components, the liquid crystal display device is identical to the liquid crystal display device 100a.

As shown in (a) of FIG. 6, the conducting layer 7 is in the shape of a grid having a predetermined width of lines along the first direction (horizontal direction in the drawing) and the second direction (vertical direction in the drawing), and in a region that, when seen in planar view, overlaps those lines of the conducting layer 7 which extend along the second direction (vertical direction in the drawing), the lines of the insulating light-blocking layer 6 that are wider than those of the conducting layer 7 are arranged at predetermined intervals along the first direction (horizontal direction in the drawing).

Moreover, although not illustrated in (a) of FIG. 6, the liquid crystal display device according to the present embodiment has a position detection electrode including electrodes having the same shapes as the sense electrodes 106a and the drive electrodes 106b shown in FIG. 11.

Furthermore, those lines of the conductive layer 7 which are provided in a region that, when seen in planar view, overlaps the sense electrodes 106a (not illustrated) arranged along the second direction (vertical direction in the drawing) are electrically connected to the sense electrodes 106a (not illustrated) and in a region that overlaps the insulating light-blocking layer 6 when seen in planar view, are broken so as to be able to conduct only for the sense electrodes 106a (not illustrated), respectively.

Meanwhile, those lines of the conductive layer 7 which are provided in a region that, when seen in planar view, overlaps the sense electrodes 106b (not illustrated) arranged along the first direction (horizontal direction in the drawing) are broken in a region that overlaps the insulating light-blocking layer 6 when seen in planar view, so as to be electrically connected to the unit electrodes 106u' (not illustrated), respectively, of each of the drive electrodes 106b.

Therefore, as shown in (b) of FIG. 6, the lines of the insulating light-blocking layer 6 that are wider than those of the conducting layer 7 are provided at predetermined intervals only in a region that, when seen in planar view, overlaps those lines of the conducting layer 7 which extend along the second direction (vertical direction in the drawing). Accordingly, in the first direction (horizontal direction in the drawing), the lines of the insulating light-blocking layer 6 that are wider than those of the conducting layer 7 make it possible to suppress a reduction in the area of an opening in each pixel.

Further, as shown in (a) of FIG. 6, since the conducting layer 7 has a break in a region overlapping the insulating light-blocking layer 6 when seen in planar view, leakage of light though cuts in the conducting layer 7 can be suppressed.

This allows the liquid crystal display device to achieve improved appearance.

[Embodiment 3]

Next, a third embodiment of the present invention is described with reference to FIG. 7 through 9. The present embodiment differs from Embodiments 1 and 2 in that on the insulating substrate 5 of the present embodiment, the conducting layer 7 is at a higher level than a layer forming the position detection electrode 9. As for the other components, the present embodiment is identical to Embodiments 1 and 2. For convenience of explanation, members having the same functions as those shown in the drawings of Embodiments 1 and 2 are given the same reference signs, and such, are not described here.

Figure 7:
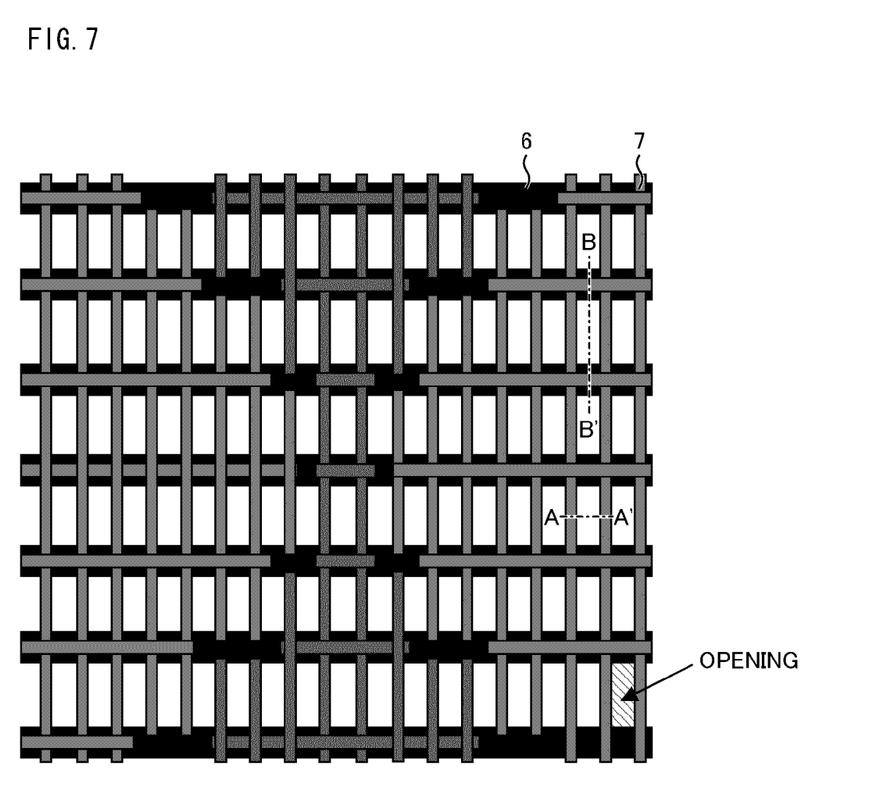
FIG. 7 is a schematic view showing a relationship of placement between an insulating light-blocking layer and a conducting layer that are provided in a liquid crystal display device according to still another embodiment of the present invention.

FIG. 7 is a schematic view showing a relationship of placement between an insulating light-blocking layer 6 and a conducting layer 7 that are provided in a liquid crystal display device 1a according to the present embodiment.

As shown in FIG. 7, the conducting layer 7 is in the shape of a grid having a predetermined width of lines along the first direction (horizontal direction in the drawing) and the second direction (vertical direction in the drawing), and in a region that, when seen in planar view, overlaps those lines of the conducting layer 7 which extend along the first direction (horizontal direction in the drawing), the lines of the insulating light-blocking layer 6 that are wider than those of the conducting layer 7 are arranged at predetermined intervals along the second direction (vertical direction in the drawing).

Moreover, although not illustrated in FIG. 7, the liquid crystal display device 1a according to the present embodiment has a position detection electrode including electrodes having the same shapes as the sense electrodes 106a and the drive electrodes 106b shown in FIG. 11.

Furthermore, those lines of the conductive layer 7 which are provided in a region that, when seen in planar view, overlaps the sense electrodes 106a (not illustrated) arranged along the second direction (vertical direction in the drawing) are electrically connected to the sense electrodes 106a (not illustrated) and in a region that overlaps the insulating light-blocking layer 6 when seen in planar view, are broken so as to be able to conduct only for the sense electrodes 106a (not illustrated), respectively.

Meanwhile, those lines of the conductive layer 7 which are provided in a region that, when seen in planar view, overlaps the sense electrodes 106b (not illustrated) arranged along the first direction (horizontal direction in the drawing) are broken in a region that overlaps the insulating light-blocking layer 6 when seen in planar view, so as to be electrically connected to the unit electrodes 106u' (not illustrated), respectively, of each of the drive electrodes 106b.

Figure 8:
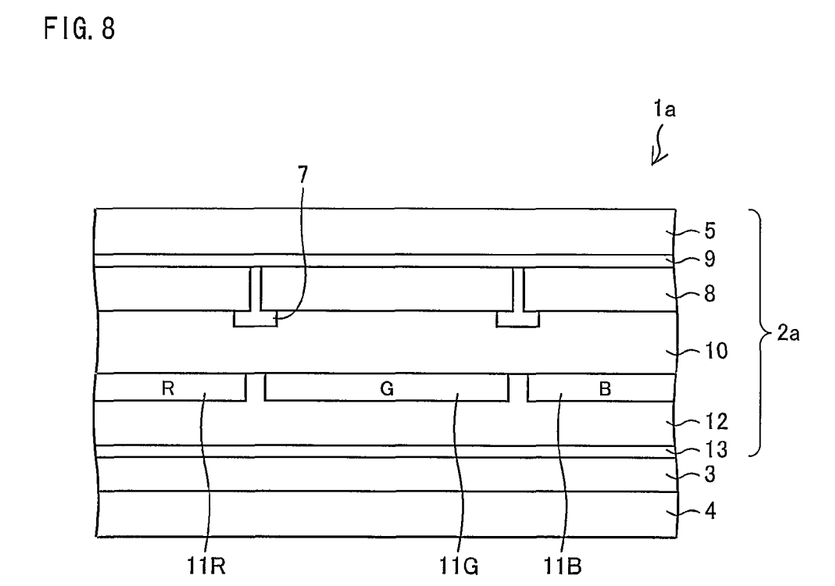
FIG. 8 is a cross-sectional view of a liquid crystal display device according to still another embodiment of the present invention as taken along the line A-A' shown in FIG. 7.

FIG. 8 is a cross-sectional view of the liquid crystal display device 1*a* as taken along the line A-A' shown in FIG. 7.

As shown in FIG. 8, the liquid crystal display device 1*a* includes a CF (color filter) substrate 2*a*, a TFT (thin-film transistor) substrate 4, and a liquid crystal layer 3 sandwiched between the CF substrate 2*a* and the TFT substrate 4.

Moreover, the CF (color filter) substrate 2*a* in this region includes the following layers joined on top of each other in the order named: the transparent insulating substrate 5; a position detection electrode 9 (i.e. the sense electrodes 106*a* and the drive electrodes 106*b* shown in FIG. 11) that allows visible light to travel therethrough; an insulating layer 8 covering the transparent insulating substrate 5 and the position detection electrode 9; the conducting layer 7 (see FIG. 7), electrically connected to the position detection electrode 9 via contact holes formed in the insulating layer 8; an insulating layer 10 covering the conducting layer 7 and the insulating layer 8; an overcoat layer 12 including a different-colored (11R, 11G, 11B) color filter layer covering the insulating layer 10; and a transparent counter electrode 13 made of ITO or the like on the overcoat layer 12.

Figure 9:
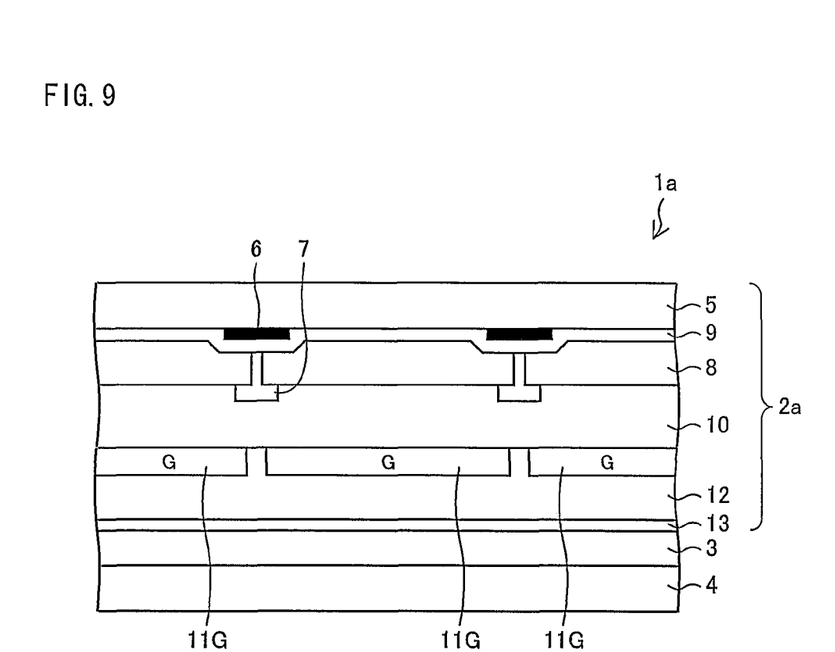
FIG. 9 is a cross-sectional view of a liquid crystal display device according to still another embodiment of the present invention as taken along the line B-B' shown in FIG. 7.

FIG. 9 is a cross-sectional view of the liquid crystal display device 1*a* as taken along the line B-B' shown in FIG. 7.

The CF (color filter) substrate 2*a* in this region includes the following layers joined on top of each other in the order named: the transparent insulating substrate 5; the insulating light-blocking layer 6 (see FIG. 7) on the transparent insulating layer 5, the insulating light-blocking layer 6 having a predetermined shape; the position detection electrode 9 (i.e. the sense electrodes 106*a* and the drive electrodes 106*b* shown in FIG. 11), covering the transparent insulating substrate 5 and the insulating light-blocking layer 6, which allows visible light to travel therethrough; the insulating layer 8, covering the transparent insulating substrate 5 and the position detection electrode 9; the conducting layer 7, electrically connected to the position detection electrode 9 via contact holes formed in the insulating layer 8; the insulating layer 10, covering the conducting layer 7 and the insulating layer 8; the overcoat layer 12, including a different-colored (11R, 11G, 11B) color filter layer covering the insulating layer 10; and the transparent counter electrode 13, made of ITO or the like on the overcoat layer 12.

As described above, a configuration in which on the insulating substrate 5, the conducting layer 7 is at a higher level than a layer forming the position detection electrode 9 makes it possible to both suppress a reduction in the area of an opening in each pixel and suppress leakage of light through cuts in the conducting layer 7.

This allows the liquid crystal display device 1*a* to achieve improved appearance.

In order to solve the foregoing problem, a touch panel substrate of the present invention is a touch panel substrate having an insulating substrate provided with a position detection electrode, the position detection electrode detecting, according to a change in capacitance, a position on coordinates as indicated by an object to be detected, the touch panel substrate including: first and second unit electrodes over the insulating substrate, the first and second unit electrodes not overlapping each other when seen in planar view, the first and second unit electrodes being adjacent to each other, the first and second unit electrodes being formed on a same plane, the first and second unit electrodes allowing visible light to travel therethrough, the position detection electrode including a plurality of first electrodes arranged along a first direction and a plurality of second electrodes arranged along a second direction intersecting the first direction, the first electrodes being each formed by a plurality of the first unit electrodes electrically connected to each other via a conducting layer that is on a different level from the first and second unit electrodes, the second electrodes being each formed by a plurality of the second unit electrodes electrically connected to each other in the same plane, the conducting layer being formed in a shape of a grid having a predetermined width of lines extending along the first direction and the second direction, in a region that, when seen in planar view, overlaps those lines of the conducting layer which extend along either the first direction or the second direction, lines of an insulating light-blocking layer that are wider than those of the conducting layer being provided at predetermined intervals, those lines of the conducting layer which are provided in a region that overlaps the first electrodes when seen in planer view being electrically connected to the first electrodes and, in a region that overlaps the insulating light-blocking layer when seen in planar view, being broken so as to be able to conduct only for the first electrodes, respectively, those lines of the conducting layer which are provided in a region that overlaps the second electrodes when seen in planer view being broken in the region that overlaps the insulating light-blocking layer when seen in planar view, so as to be electrically connected to the second unit electrodes, respectively, of each of the second electrodes.

The touch panel substrate of the present invention is preferably configured such that the lines of the insulating light-blocking layer are placed at predetermined intervals in a region that, when seen planar view, overlaps those lines of the conducting layer which extend along the first direction.

The touch panel substrate of the present invention is preferably configured such that the lines of the insulating light-blocking layer are placed at predetermined intervals in a region that, when seen planar view, overlaps those lines of the conducting layer which extend along the second direction.

According to the foregoing configuration, the lines of the insulating light-blocking layer that are wider than those of the conducting layer are provided at predetermined intervals only in a region that, when seen in planar view, overlaps those lines of the conducting layer which extend along either the first direction or the second direction. Accordingly, the lines of the insulating light-blocking layer that are wider than those of the conducting layer make it possible to suppress a reduction in the area of an opening in each pixel, thus making it possible to achieve a touch panel substrate that has a high aperture ratio in each pixel.

Further, according to the foregoing configuration, since the conducting layer has a break in a region that overlaps the insulating light-blocking layer 6 when seen in planar view, leakage of light though cuts in the conducting layer can be suppressed.

The touch panel substrate of the present invention is preferably configured such that the conducting layer has its surface coated with a chromium oxide layer.

The foregoing configuration, in which the conducting layer has its surface coated with a chromium oxide layer, makes it possible to suppress a degradation in appearance due to reflection by the conducting layer even when the conducting layer is made of a comparatively high-reflectivity material such as a metal.

The touch panel substrate of the present invention is preferably configured such that the conducting layer is provided on a lower level than the first and second unit electrodes over the insulating substrate.

The touch panel substrate of the present invention is preferably configured such that the conducting layer is provided on a higher level than the first and second unit electrodes over the insulating substrate.

According to the foregoing configuration, the conducting layer may be provided on a lower or higher level than the first and second unit electrodes over the insulating substrate.

The touch panel substrate of the present invention is preferably configured to further include a driving electrode layer as an uppermost layer over the insulating substrate, the driving electrode layer being driven at a predetermined voltage, wherein the position detection electrode being provided between the insulating substrate and the driving electrode layer and insulated from the driving electrode layer.

According to the foregoing configuration, the touch panel substrate includes a driving electrode layer (common electrode layer) as an uppermost layer over the insulating substrate, the driving electrode layer being driven at a predetermined voltage, and therefore can be suitably used as a touch panel substrate for use in a liquid crystal mode display device that requires a common electrode.

The touch panel substrate of the present invention is preferably configured such that the insulating substrate is provided with a color filter layer.

The foregoing configuration makes it possible to achieve a touch panel substrate provided with a color filter layer.

In order to solve the foregoing problems, a display device of the present invention includes such a touch panel substrate.

The foregoing configuration, the display device include a touch panel substrate that has a high aperture ratio and that can suppress leakage of light through cuts in a conducting layer, and therefore can have improved appearance.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to the field of display devices such as liquid crystal display devices.

REFERENCE SIGNS LIST 1, 1a Liquid crystal display device (display device)
2, 2a CF substrate (touch panel substrate)
3 Liquid crystal layer
4 TFT substrate
5 Transparent insulating substrate (insulating substrate)
6 Insulating light-blocking layer
7 Conducting layer
8 Insulating layer
9 Position detection electrode
10 Insulating layer
11R, 11G, 11B Color filter layer
12 Overcoat layer
13 Counter electrode (driving electrode layer)
106u Unit electrode
106u' Unit electrode
106a First electrode
106b Second electrode

The invention claimed is:
1. A touch panel substrate having an insulating substrate provided with a position detection electrode, the position detection electrode detecting, according to a change in capacitance, a position on coordinates as indicated by an object to be detected, the touch panel substrate comprising:
first and second unit electrodes over the insulating substrate, the first and second unit electrodes not overlapping each other when seen in planar view, the first and second unit electrodes being adjacent to each other, the first and second unit electrodes being formed on a same plane, the first and second unit electrodes allowing visible light to travel therethrough;
the position detection electrode including a plurality of first electrodes arranged along a first direction and a plurality of second electrodes arranged along a second direction intersecting the first direction;
the first electrodes being each formed by a plurality of the first unit electrodes electrically connected to each other via a conducting layer that is on a different level from the first and second unit electrodes;
the second electrodes being each formed by a plurality of the second unit electrodes electrically connected to each other in the same plane;
the conducting layer being formed in a shape of a grid having a predetermined width of lines extending along the first direction and the second direction;
in a region that, when seen in planar view, lines of an insulating light-blocking layer overlap the lines of the conducting layer which extend along either the first direction or the second direction, the lines of an insulating light-blocking layer that are wider than the lines of the conducting layer are provided at predetermined intervals;
the lines of the conducting layer, which are provided in a region that the lines of the conducting layer overlap the first electrodes when seen in planar view, are electrically connected to the first electrodes and, in a region that the lines of the conducting layer overlap the insulating light-blocking layer when seen in planar view, are broken so as to be able to conduct only for the first electrodes, respectively, and
the lines of the conducting layer, which are provided in a region that the lines of the conducting layer overlap the second electrodes when seen in planar view, are broken in the region that the lines of the conducting layer overlap the insulating light-blocking layer when seen in planar view, so as to be electrically connected to the second unit electrodes, respectively, of each of the second electrodes.

2. The touch panel substrate as set forth in claim 1, wherein the conducting layer has its surface coated with a chromium oxide layer.

3. The touch panel substrate as set forth in claim 1, wherein the lines of the insulating light-blocking layer are placed at predetermined intervals in a region that, when seen planar view, overlaps those lines of the conducting layer which extend along the first direction.

4. The touch panel substrate as set forth in claim 1, wherein the lines of the insulating light-blocking layer are placed at predetermined intervals in a region that, when seen planar view, overlaps those lines of the conducting layer which extend along the second direction.

5. The touch panel substrate as set forth in claim 1, wherein the conducting layer is provided on a lower level than the first and second unit electrodes over the insulating substrate.

6. The touch panel substrate as set forth in claim 1, wherein the conducting layer is provided on a higher level than the first and second unit electrodes over the insulating substrate.

7. The touch panel substrate as set forth in claim 1, further comprising a driving electrode layer as an uppermost layer over the insulating substrate, the driving electrode layer being driven at a predetermined voltage, wherein the position detection electrode being provided between the insulating substrate and the driving electrode layer and insulated from the driving electrode layer.

8. The touch panel substrate as set forth in claim 1, wherein the insulating substrate is provided with a color filter layer.

9. A display device comprising a touch panel substrate as set forth in claim 1.

\* \* \* \* \*